United States Patent
Mai et al.

(10) Patent No.: US 10,824,649 B2
(45) Date of Patent: *Nov. 3, 2020

(54) NATURAL PERSON INFORMATION SETTING METHOD AND ELECTRONIC DEVICE

(71) Applicant: TENCENT TECHNOLOGY (SHENZHEN) COMPANY LIMITED, Shenzhen (CN)

(72) Inventors: Junming Mai, Shenzhen (CN); Lingling Yi, Shenzhen (CN); Chuan Chen, Shenzhen (CN); Xiaoping Lei, Shenzhen (CN); Tashan Ji, Shenzhen (CN); Yuewen Liu, Shenzhen (CN); Peng He, Shenzhen (CN); Yuhuang Li, Shenzhen (CN); Weihua Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 331 days.

This patent is subject to a terminal disclaimer.

(21) Appl. No.: 16/018,761

(22) Filed: Jun. 26, 2018

(65) Prior Publication Data

US 2018/0307742 A1 Oct. 25, 2018

Related U.S. Application Data

(63) Continuation of application No. 14/420,826, filed as application No. PCT/CN2013/079746 on Jul. 19, 2013, now Pat. No. 10,037,373.

(30) Foreign Application Priority Data

Aug. 16, 2012 (CN) .......................... 2012 1 0292336

(51) Int. Cl.
*G06F 16/28* (2019.01)
*G06F 16/22* (2019.01)
(Continued)

(52) U.S. Cl.
CPC .......... *G06F 16/285* (2019.01); *G06F 16/215* (2019.01); *G06F 16/2272* (2019.01); *G06F 16/9535* (2019.01)

(58) Field of Classification Search
CPC .. G06F 16/285; G06F 16/2272; G06F 16/215; G06F 16/9535
(Continued)

(56) References Cited

U.S. PATENT DOCUMENTS 8,417,696 B2 4/2013 Gupta
8,472,662 B2 6/2013 Muriello
(Continued)

FOREIGN PATENT DOCUMENTS

CN 101079893 A 11/2007
CN 101968818 A 2/2011
(Continued)

OTHER PUBLICATIONS

International Search Report in international application No. PCT/CN2013/079746, dated Sep. 26, 2013.
(Continued)

*Primary Examiner* — James Trujillo
*Assistant Examiner* — Fariborz Khoshnoodi
(74) *Attorney, Agent, or Firm* — Syncoda LLC; Feng Ma

(57) ABSTRACT

A natural person information setting method, an account information providing method, and electronic devices include: an associated set of each account is determined according to a degree of association and an exclusion index of another account with the each account; convergence processing is performed on all associated sets, such that after
(Continued)

the convergence processing, no associated account in any one associated set appears in another associated set; and identical natural person information is set for any associated account in a same associated set having gone through the convergence processing, and a same natural person is set for any associated account in the same associated set according to the identical natural person information.

20 Claims, 10 Drawing Sheets

(51) Int. Cl.
*G06F 16/9535* (2019.01)
*G06F 16/215* (2019.01)

(58) Field of Classification Search
USPC .................................................. 707/732, 734
See application file for complete search history.

(56) References Cited

U.S. PATENT DOCUMENTS

| | | | | |
|---|---|---|---|---|
| 8,549,073 | B2* | 10/2013 | Dale | ..................... H04L 67/306 709/204 |
| 8,819,236 | B2 | 8/2014 | Gkantsidis | |
| 9,020,957 | B1* | 4/2015 | Schneider | ........... G06F 16/9536 707/749 |
| 2007/0016630 | A1 | 1/2007 | Samji | |
| 2010/0106724 | A1 | 4/2010 | Anderson | |
| 2011/0307455 | A1 | 12/2011 | Gupta | |
| 2012/0072493 | A1 | 3/2012 | Muriello | |
| 2012/0084666 | A1 | 4/2012 | Hickman | |
| 2012/0158715 | A1* | 6/2012 | Maghoul | ............... G06F 16/951 707/728 |

FOREIGN PATENT DOCUMENTS

| | | |
|---|---|---|
| CN | 102279948 A | 12/2011 |
| CN | 102387512 A | 3/2012 |
| CN | 102571485 A | 7/2012 |
| KR | 100807354 B1 | 2/2008 |
| KR | 20080024513 A | 3/2008 |
| KR | 20110090939 A | 8/2011 |
| TW | 201232440 A1 | 8/2012 |

OTHER PUBLICATIONS

English Translation of the Written Opinion of the International Search Authority in international application No. PCT/CN2013/079746, dated Sep. 26, 2013.
Notification of the First Office Action of TW application No. TW100101808 , dated Jun. 4, 2015.
English Translation of the Notification of the First Office Action of Chinese application No. 201210292336.0 , dated Sep. 11, 2015.
English Translation of the Notice of Allowance by Korean application No. 10-2015-7004658, dated Sep. 7, 2015.

* cited by examiner

NATURAL PERSON INFORMATION SETTING METHOD AND ELECTRONIC DEVICE

CROSS-REFERENCE TO RELATED APPLICATIONS

This is a continuation application of U.S. application Ser. No. 14/420,826, filed on Feb. 10, 2015, which is a national phase application of PCT/CN2013/079746, filed Jul. 19, 2013 and claims the priority of Chinese Patent Application No. 201210292336.0, filed on Aug. 16, 2012, the disclosures of which are incorporated herein by reference in their entireties.

TECHNICAL FIELD

The disclosure relates to the field of online social activities, and in particular to a natural person information setting method, an account information providing method, electronic devices, and a storage medium.

BACKGROUND

At present, there exist a lot of virtual social networking platforms for online virtual social activities. People often will introduce a real-life friend of theirs to a virtual social networking platform they have joined. Therefore, a lot of "circles" reflecting a relationship of people in real life exist in a virtual social networking platform. In each circle, the circle host (who has an account at the virtual social networking platform) may see a friend of his/hers. According to a number of friends shared by accounts of two circle hosts, the virtual social networking platform may recommend each one of the accounts of two circle hosts the other one.

FIG. 1 is a schematic diagram of a relationship among multiple circles on a virtual social networking platform, where a circle host A and a circle host B do not know each other (or do not know each other on the virtual social networking platform), but an account of the circle host A and an account of the circle host B share three common friends C1, C2 and C3, in which case the virtual social networking platform determines that the circle host A and the circle host B have close real-life social circles, and therefore will recommend the account of the circle host B to the account of the circle host A and recommend the account of the circle host A to the account of the circle host B. Thus, a circle host may meet, via a friend of a friend of an account of the circle host, more people close to the circle host in real life, thereby may further expand a real-life social circle of the circle host.

However, in reality a natural person may have multiple accounts on the same virtual social networking platform. For example, friends C1, C2, and C3 shared by the account of the circle host A and the account of the circle host B may be three accounts of the same natural person C on the virtual social network. The account of the circle host A and the account of the circle host B actually have only one real-life common friend (namely, natural person C), and the circle host A and the circle host B have little overlap in real life, but the virtual social networking platform mistakes that the circle host A and the circle host B have close social circles in real life, and then performs a friend recommendation failing to truthfully reflect a real-life relationship for a circle host, while leading to waste of system resources for performing friend recommendation at the same time.

SUMMARY

Embodiments of the disclosure provide a natural person information setting method, an account information providing method, and electronic devices, capable of eliminating negative impact of a natural person having multiple accounts on friend recommendation, such that system resources may be utilized more effectively in performing friend recommendation. In this way, negative impact a natural person having multiple accounts may produce on friend recommendation is eliminated, while avoiding waste of system resources for performing friend recommendation at the same time.

To this end, the disclosure provides the following technical solutions.

The disclosure provides a natural person information setting method, which includes the following steps:

an associated set of each account is determined according to a degree of association and an exclusion index of another account with the each account;

convergence processing is performed on all associated sets, such that after the convergence processing, no associated account in any one associated set appears in another associated set; and identical natural person information is set for any associated account in a same associated set having gone through the convergence processing, and a same natural person is set for any associated account in the same associated set according to the identical natural person information.

An embodiment of the disclosure further provides an electronic device, which includes one or more processors, a memory, and one or more programs stored in the memory and configured to be executed by the one or more processors to provide a natural person information setting method.

The one or more programs includes, according to functions, an associated-set determining module, a converging module and a setting module.

The associated-set determining module is configured for determining an associated set of each account according to a degree of association and an exclusion index of another account with the each account.

The converging module is configured for performing convergence processing on all associated sets, such that after the convergence processing, no associated account in any one associated set appears in another associated set.

The setting module is configured for setting identical natural person information for any associated account in a same associated set having gone through the convergence processing, and setting a same natural person for any associated account in the same associated set according to the identical natural person information.

An embodiment of the disclosure further provides an account information providing method, which includes the following steps:

according to a number of contact accounts shared by a first account and a second account, the second account is determined as a contact account to be recommended to the first account, wherein the second account is not a contact account of the first account;

according to natural person information of a contact account shared by the first account and the contact account to be recommended to the first account, the number of the contact accounts shared by the first account and the contact account to be recommended to the first account is modified to obtain the modified number of the contact accounts shared by the first account and the contact account to be recommended to the first account; and according to the modified number of the contact accounts shared by the first account and the contact account to be recommended to the first account, account information of the contact account to be recommended to the first account is provided to the first account.

The natural person information of the contact account shared by the first account and the contact account to be recommended to the first account is set using the natural person information setting method.

An embodiment of the disclosure further provides an electronic device, which includes one or more processors, a memory, and one or more programs stored in the memory and configured to be executed by the one or more processors to provide an account information providing method.

The one or more programs includes, according to functions, a to-be-recommended-contact acquiring module, a modifying module and an information providing module.

The to-be-recommended-contact acquiring module is configured for determining, according to a number of contact accounts shared by a first account and a second account, the second account as a contact account to be recommended to the first account, wherein the second account is not a contact account of the first account.

The modifying module is configured for modifying, according to natural person information of a contact account shared by the first account and the contact account to be recommended to the first account, the number of the contact accounts shared by the first account and the contact account to be recommended to the first account to obtain the modified number of the contact accounts shared by the first account and the contact account to be recommended to the first account.

The information providing module is configured for providing, according to the modified number of the contact accounts shared by the first account and the contact account to be recommended to the first account, the first account with account information of the contact account to be recommended to the first account.

The natural person information of the contact account shared by the first account and the contact account to be recommended to the first account is set using the aforementioned electronic device.

Compared with an existing account information providing method, with the natural person information setting method, the account information providing method, and the electronic devices according to the disclosure, it is possible to eliminate negative impact of a natural person having multiple accounts on friend recommendation, such that system resources may be utilized more effectively in performing friend recommendation. Negative impact a natural person having multiple accounts may produce on friend recommendation is eliminated while avoiding waste of system resources for performing friend recommendation.

BRIEF DESCRIPTION OF THE DRAWINGS

To illustrate technical solutions according to embodiments of the disclosure more clearly, drawings required in describing embodiments of the disclosure will be briefly introduced below. Notably, drawings described below are merely some embodiments of the disclosure, and those with ordinary skills in the art may further obtain other drawings according to such drawings without exercising inventive skill.

DETAILED DESCRIPTION

Clear, complete description of a technical solution in an embodiment of the disclosure will be given below with reference to drawings in embodiments of the disclosure. Notably, the described embodiments are merely some embodiments instead of all embodiments of the disclosure. Any other embodiment obtained by those with ordinary skills in the art based on an embodiment in the disclosure without exercising inventive skill shall fall within the protection scope of the disclosure.

Figure 2:
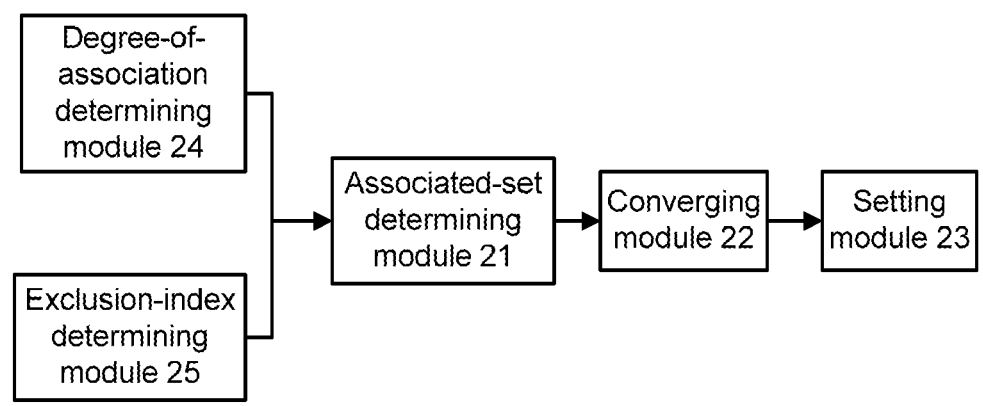
FIG. 2 is a schematic diagram of a structure of an electronic device according to the disclosure.

The disclosure relates to an electronic device, referring to FIG. 2, which is a schematic diagram of a structure of an electronic device according to the disclosure. The electronic device includes an associated-set determining module 21, a converging module 22, a setting module 23, a degree-of-association determining module 24 and an exclusion-index determining module 25.

The associated-set determining module 21 may be configured for determining an associated set of each account according to a degree of association and an exclusion index of another account with the each account; the converging module 22 may be configured for merging two associated sets with identical associated accounts, and dividing associated sets sharing some of associated accounts into multiple associated sets, such that after the convergence processing, no associated account in any one associated set appears in another associated set; the setting module 23 may be configured for setting identical natural person information for any associated account in a same associated set having gone through the convergence processing, and setting a same natural person for any associated account in the same associated set according to the identical natural person information.

The degree-of-association determining module 24 may be configured for determining, according to information on static association and information on dynamic association of the another account with the each account, the degree of association of the another account with the each account; the exclusion-index determining module 25 may be configured for determining, according to information on static exclusion and information on dynamic exclusion of the another account with the each account, the exclusion index of the another account with the each account. The information on static association of the another account with the each account may include but is not limited to at least one of: a similarity between personal data of the each account and personal data of the another account, a similarity between contact information of the each account and contact information of the another account, and a similarity between interest information of the each account and interest information of the another account. The information on dynamic association of the another account with the each account may include but is not limited to at least one of: a similarity between login behavior information of the each account and login behavior information of the another account, and a similarity between online behavior information of the each account and online behavior information of the another account. The information on static exclusion may include but is not limited to a similarity between physical location information of the each account and physical location information of the another account. The information on dynamic exclusion may include but is not limited to at least one of: a similarity between login behavior information of the each account and login behavior information of the another account, a similarity between online behavior information of the each account and online behavior information of the another account, and information on an interaction of the another account with the each account.

The associated-set determining module 21 may include a tentative-associated-set determining unit and a filtering unit. The tentative-associated-set determining unit may be configured for determining a tentative associated set of an account for which natural person information is to be set according to the degree of association of the another account with the each account, and the tentative associated set includes a candidate associated account. The filtering unit may be configured for filtering, according to a degree of association and an exclusion index of another account in the tentative associated set with an account in the tentative associated set, the candidate associated account in the tentative associated set to obtain an associated set of the account for which the natural person information is to be set, and the associated set of the account for which the natural person information is to be set includes an associated account.

The tentative-associated-set determining unit may include a first determining sub-unit and a second determining sub-unit. The first determining sub-unit may be configured for putting the account for which the natural person information is to be set into the tentative associated set. The second determining sub-unit may be configured for: determining the degree of association of another account with an account put in the tentative associated set; and when it is determined that the degree of association of the another account with the account put in the tentative associated set is greater than a first set value and that the another account has not been put in the tentative associated set, putting the another account into the tentative associated set.

The filtering unit may include a first filtering sub-unit and a second filtering sub-unit. The first filtering sub-unit may be configured for: determining whether the account for which the natural person information is to be set and the candidate associated account in the tentative associated set are owned by different owners according to a different-owner condition; and removing a candidate associated account meeting the different-owner condition from the tentative associated set. The second filtering sub-unit may be configured for: determining whether any two candidate associated accounts in the tentative associated set that have been processed by the first filtering sub-unit are owned by different owners according to the different-owner condition; and removing, from the tentative associated set, a candidate associated account of the two candidate associated accounts meeting the different-owner condition that has a smaller degree of association with the account for which the natural person information is to be set, to obtain the associated set of the account for which the natural person information is to be set.

In using the electronic device according to the disclosure, first, a degree of association of another account with each account is determined via the degree-of-association determining module 24, then an exclusion index of another account with each account is determined via the exclusion-index determining module 25. See step S401 below in a specific embodiment of a natural person information setting method for a specific working flow of the degree-of-association determining module 24 and the exclusion-index determining module 25.

Subsequently, the tentative-associated-set determining unit of the associated-set determining module 21 determines a candidate associated account in a tentative associated set of an account for which natural person information is to be set according to the degree of association of another account with each account. A first determining sub-unit of the tentative-associated-set determining unit puts the account for which the natural person information is to be set into the tentative associated set. A second determining sub-unit of the tentative-associated-set determining unit determines the degree of association of another account with the account put in the tentative associated set, and when it is determined that the degree of association of the second account with the account put in the tentative associated set is greater than the first set value and that the another account has not been put in the tentative associated set, puts the another account into the tentative associated set, thereby determining the tentative associated set of the account for which natural person information is to be set. See step S402 below in a specific embodiment of the natural person information setting method for a specific working flow of the tentative-associated-set determining unit.

Subsequently, the filtering unit of the associated-set determining module 21 filters the candidate associated account in the tentative associated set according to a degree of association and an exclusion index of another account in the tentative associated set with an account in the tentative associated set. The first filtering sub-unit determines whether the account for which the natural person information is to be set and the candidate associated account in the tentative associated set are owned by different owners according to a different-owner condition; and removes a candidate associated account meeting the different-owner condition from the tentative associated set. The second filtering sub-unit determines whether any two candidate associated accounts in the tentative associated set that have been processed by the first filtering sub-unit are owned by different owners according to the different-owner condition; and removes, from the tentative associated set, a candidate associated account of the two candidate associated accounts meeting the different-owner condition that has a smaller degree of association with the account for which the natural person information is to be set, so as to determine the associated set of the account for which the natural person information is to be set. See step S403 below in a specific embodiment of the natural person information setting method for a specific working flow of the filtering unit.

Each account in a virtual social networking platform is subsequently taken as the account for which natural person information is to be set, and an associated account in an associated set of each account is determined via the associated-set determining module 21 to obtain a number of associated sets, where the number of the associated sets equals the number of accounts.

Subsequently, the converging module 22 performs convergence processing on the associated sets, namely, divides an associated set sharing an identical associated account with another associated set into multiple associated sets, and merges two associated sets with identical associated accounts, such that after the convergence processing, no associated account in any one associated set appears in another associated set; meanwhile, no two associated accounts in each associated set meet the aforementioned different-owner condition.

Finally, the setting module 23 sets identical natural person information for any associated account in a same associated set having gone through the convergence processing, and sets a same natural person for any associated account in the same associated set according to the identical natural person information.

Figure 3:
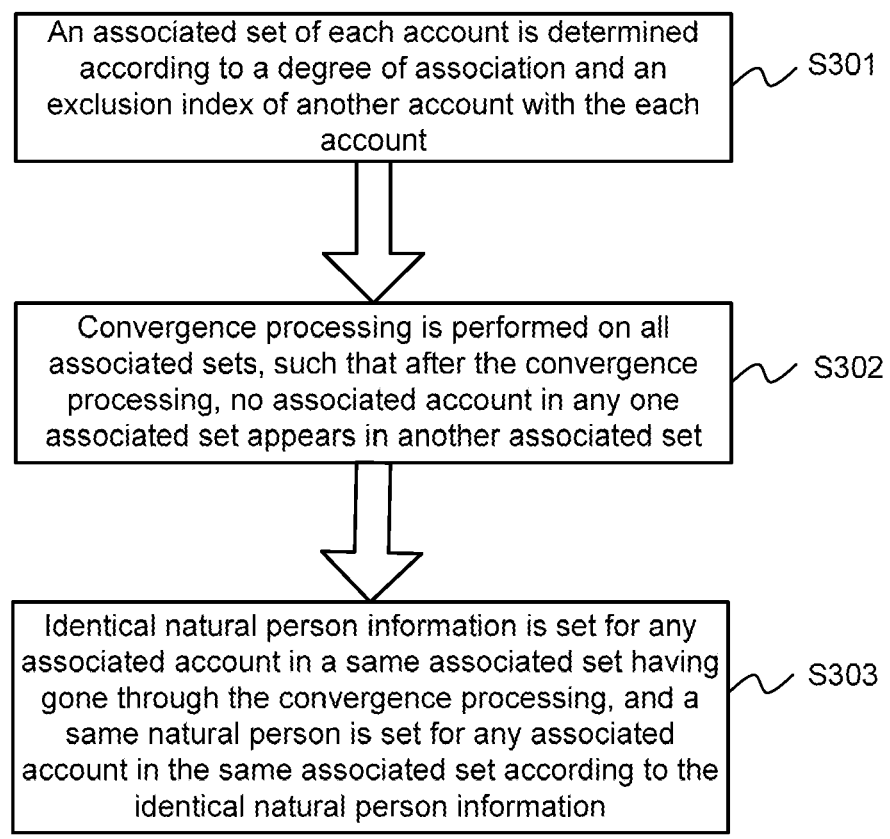
FIG. 3 is a flowchart of a natural person information setting method according to a preferred embodiment of the disclosure.

The disclosure further relates to a natural person information setting method, referring to FIG. 3, which is a flowchart of a natural person information setting method according to a preferred embodiment of the disclosure. The natural person information setting method includes steps as follows.

In step S301, an associated set of each account is determined according to a degree of association and an exclusion index of another account with the each account.

In step S302, convergence processing is performed on all associated sets, such that after the convergence processing, no associated account in any one associated set appears in another associated set.

In step S303, identical natural person information is set for any associated account in a same associated set having gone through the convergence processing, and a same natural person is set for any associated account in the same associated set according to the identical natural person information.

The natural person information setting method ends at step S303.

A specific flow of each step of the natural person information setting method according to the disclosure is elaborated below with reference to FIG. 4, which is a detailed flowchart of a natural person information setting method according to a preferred embodiment of the disclosure.

In step S401, first, a degree of association and an exclusion index of another account with each account in the virtual social networking platform are calculated via the degree-of-association determining module 24 and the exclusion-index determining module 25.

The degree of association of another account with each account D may include information on static association D1 and information on dynamic association D2, with $D = w1*D1 + w2*D2$, where w1+w2=1, w1 and w2 are constants, with 0<w1<1, and 0<w2<1.

The information on static association D1 may include but is not limited to at least one of: a similarity between personal data of the each account and personal data of the another account, a similarity between contact information of the each account and contact information of the another account, and a similarity between interest information of the each account and interest information of the another account. As personal data, contact information and interests information of the same natural person in general will be identical or similar, the greater the similarities are, the greater the information on static association D1 will be, and the less the similarities are, the less the information on static association D1 will be.

The information on dynamic association D2 may include but is not limited to at least one of: a similarity between login behavior information of the each account and login behavior information of the another account, and a similarity between online behavior information of the each account and online behavior information of the another account. The online behavior information may include a browsing behavior by an account, and the like. As online time information and online behavior information of the same natural person in general will be identical or similar, the greater the similarities are, the greater the information on dynamic association D2 will be, and the less the similarities are, the less the information on dynamic association D2 will be.

The virtual social networking platform may change, by adjusting w1 and w2, weights of impact of information on static association D1 and information on dynamic association D2 on the degree of association D.

An exclusion index of another account with each account E includes information on static exclusion E1 and information on dynamic exclusion E2, with $E = y1*E1 + y2*E2$, where y1+y2=1, and y1 and y2 are constants, with 0<y1<1, and 0<y2<1.

The information on static exclusion E1 may include but is not limited to a similarity between physical location information of each account and physical location information of another account. As the same natural person in general will not log in the virtual social networking platform at different places frequently, the greater the similarities are, the less the information on static exclusion E1 will be, and the less the similarities are, the greater the information on static exclusion E1 will be.

The information on dynamic exclusion E2 may include but is not limited to at least one of: a similarity between login behavior information of each account and login behavior information of another account, a similarity between online behavior information of each account and online behavior information of another account, and information on an interaction of another account with each account. As login behavior information and online behavior information of the same natural person in general will be identical or similar, the greater the similarities are, the less the information on dynamic exclusion E2 will be, and the less the similarities are, the greater the information on dynamic exclusion E2 will be. Information on the interaction may include a duration and a frequency of an interacting activity such as mutual accessing. As the same natural person in general will not interact with oneself, the longer the duration of an interacting activity, and/or the greater the frequency of the interacting activity, the greater the information on dynamic exclusion E2 will be, otherwise the less the information on dynamic exclusion E2 will be.

The virtual social networking platform may change, by adjusting y1 and y2, weights of impact of information on static exclusion E1 and information on dynamic exclusion E2 on the exclusion index E.

The degree of association D and the exclusion index E of another account with each account may be obtained via the aforementioned step S401.

Figure 4:
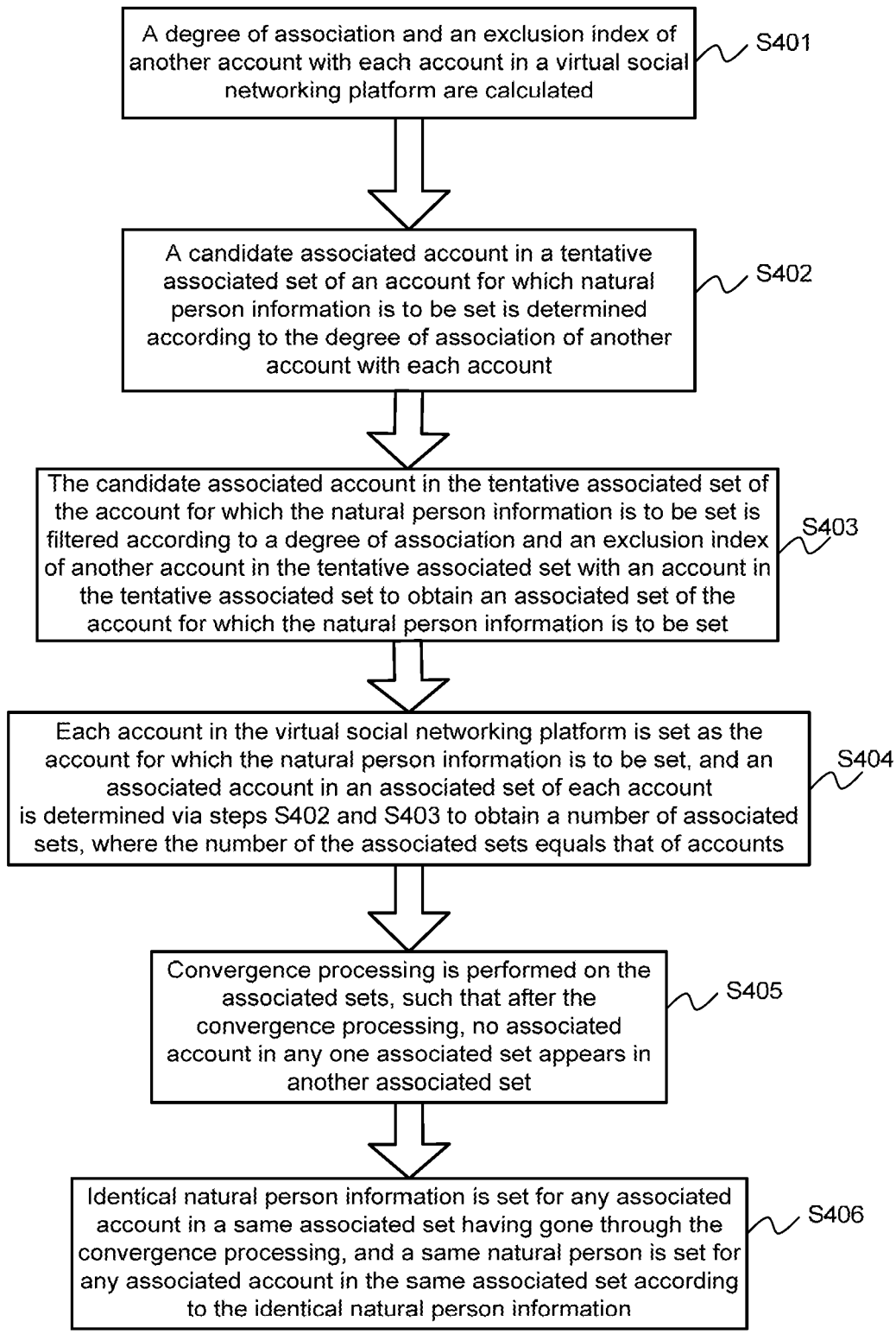
FIG. 4 is a detailed flowchart of a natural person information setting method according to a preferred embodiment of the disclosure.
Figure 5:
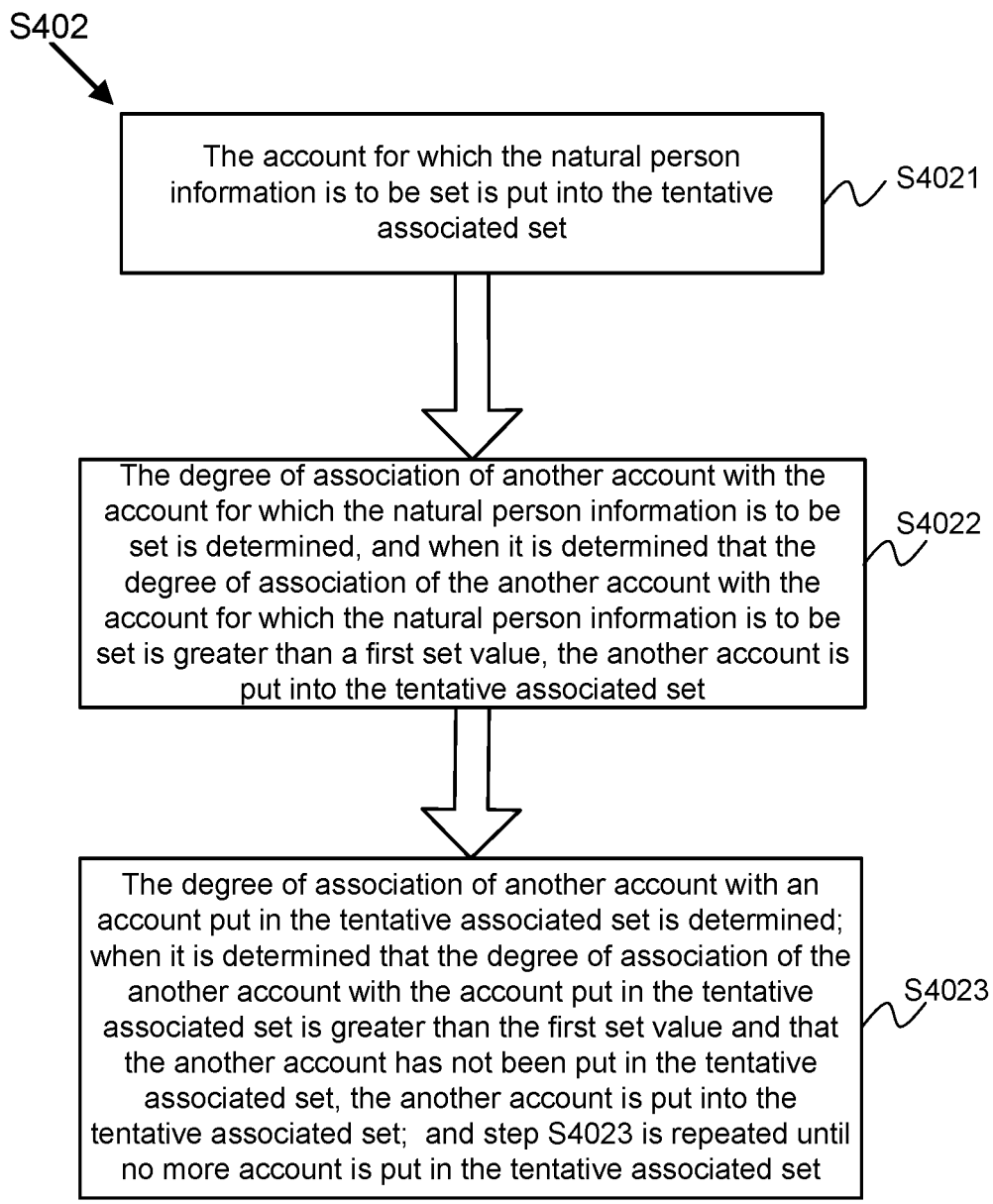
FIG. 5 is a detailed flowchart of step S302 shown in FIG. 4.

FIG. 5 is a detailed flowchart of step S402 shown in FIG. 4.

In step S402, the associated-set determining module 21 may determine a tentative associated set of an account for which natural person information is to be set (or a to-be-set account, for short) according to the degree of association of another account with each account, where the tentative associated set includes a candidate associated account. Step S402 may further include steps as follows.

In step S4021, the to-be-set account is put into the tentative associated set, and the flow goes to step S4022.

In step S4022, the degree of association of another account with the to-be-set account is determined, and when it is determined that the degree of association of the another account with the to-be-set account is greater than a first set value, the another account is put into the tentative associated set, and the flow goes to step S4023.

In step S4023, the degree of association of another account with an account put in the tentative associated set in step S4022 is determined; when it is determined that the degree of association of the another account with the account put in the tentative associated set in step S4022 is greater than the first set value and that the another account has not been put in the tentative associated set, the another account is put into the tentative associated set; and step S4023 is repeated until no more account is put in the tentative associated set, in which case the tentative associated set may include a candidate associated account and the to-be-set account. The first set value in steps S4022 and S4023 may be set as needed by an account.

A candidate associated account in the tentative associated set of the to-be-set account is determined tentatively via the aforementioned step S402.

Figure 6:
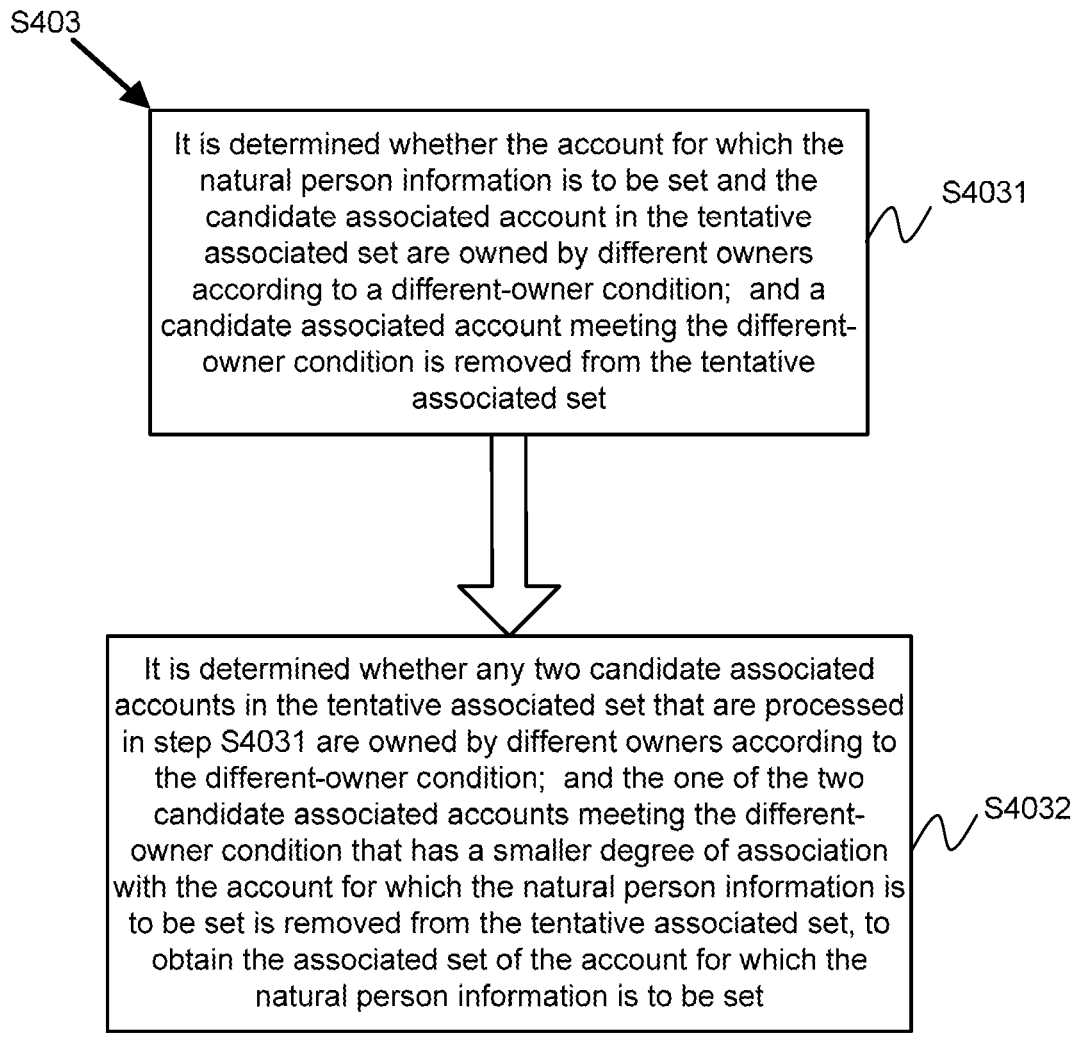
FIG. 6 is a detailed flowchart of step S303 shown in FIG. 4.

FIG. 6 is a detailed flowchart of step S403 shown in FIG. 4.

In step S403, the filtering unit of the associated-set determining module 21 may filter, according to a degree of association and an exclusion index of another account in the tentative associated set with an account in the tentative associated set, the candidate associated account in the tentative associated set of the account for which the natural person information is to be set to obtain an associated set of the account for which the natural person information is to be set. The step S403 may further include steps as follows.

In step S4031, it is determined whether the account for which the natural person information is to be set and the candidate associated account in the tentative associated set are owned by different owners according to a different-owner condition of $E >= p*D$, where $0<p<1$.

If the degree of association D and the exclusion index E of the candidate associated account in the tentative associated set with the account for which natural person information is to be set meet the aforementioned condition, then the candidate associated account meeting the different-owner condition is removed from the tentative associated set, where p may be set as needed by a subscriber, and the flow goes to step S4032.

In step S4032, it is determined whether any two candidate associated accounts in the tentative associated set that have been processed in step S4032 are owned by different owners according to the different-owner condition of $E >= p*D$, where $0<p<1$.

If the degree of association D and the exclusion index E between two candidate associated accounts meet the aforementioned condition, then the one of the two candidate associated accounts that has a smaller degree of association with the account for which the natural person information is to be set is removed from the tentative associated set, to obtain the associated set of the account for which the natural person information is to be set, where p may be set as needed by a subscriber. In this case, the associated set includes an associated account; meanwhile, after the determination, the account for which natural person information is to be set is also set as an associated account in the associated set.

Finally, an associated account in the associated set of the account for which natural person information is to be set is determined via the aforementioned step S403.

In step S404, each account in the virtual social networking platform is set as the account for which the natural person information is to be set, and an associated account in an associated set of the each account is determined via steps S402 and S403 to obtain a number of associated sets, where the number of the associated sets equals that of accounts.

In step S405, the converging module 22 performs convergence processing on the associated sets, namely, divides an associated set sharing an identical associated account with another associated set into multiple associated sets, and merges two associated sets with identical associated accounts, such that after the convergence processing, no associated account in any one associated set appears in another associated set; meanwhile, no two associated accounts in each associated set meet the aforementioned different-owner condition.

In step S406, the setting module 23 may set identical natural person information for any associated account in a same associated set having gone through the convergence processing, and set a same natural person for any associated account in the same associated set according to the identical natural person information.

A process of setting the natural person information of a certain account (a shared friend) using the natural person information setting method according to the disclosure is illustrated below via a specific embodiment of the account.

In step S401, a degree of association and an exclusion index of another account with each account in a virtual social networking platform are obtained via the degree-of-association determining module 24 and the exclusion-index determining module 25. The virtual social networking platform may be a networking platform such as QQ, WeChat, or the like.

In step S402, the associated-set determining module 21 assumes the account for which natural person information is to be set is A. If both degrees of association of accounts A1 and A2 with to-be-set account A are greater than the first set value, then accounts A, A1, and A2 are put into an associated set a of the to-be-set account A, in which case the associated set a={A, A1, A2}.

Then, degrees of association of another account with accounts A1, A2 are determined. If the degree of association of account A3 with account A1 is greater than the first set value, and degrees of association of accounts A4, A5 with account A2 are greater than the first set value, then accounts A3, A4, and A5 are put into tentative associated set a of the to-be-set account A, in which case tentative associated set a={A, A1, A2, A3, A4, A5}.

Subsequently, degrees of association of another account, respectively with accounts A3, A4, and A5 recently put in the tentative associated set a, are determined. If the degree of association of a certain account with any one of accounts A3, A4, or A5 is greater than the first set value, and the certain account is not in the tentative associated set a right now, then the certain account is also put into the tentative associated set a. Such determination is performed subsequently on any account recently put in the tentative associated set a, until no more account is put in the tentative associated set a. Here, assume that after step S302, the tentative associated set a of the to-be-set account A is a={A, A1, A2, A3, A4, A5, A6}, including candidate associated accounts A1 to A6.

In step S403, the filtering unit of the associated-set determining module 21 determines whether the to-be-set account A and each of the candidate associated accounts A1-A6 in the tentative associated set a are owned by different owners, namely, determines whether two accounts in each pair of A and A1, A and A2, A and A3, A and A4, A and A5, A and A6 are respectively owned by two different owners. If degrees of association of D and exclusion indices E of the candidate associated accounts A1-A3 with the to-be-set account A meet the different-owner condition (E>=p*D, 0<p<1), then the candidate associated accounts A1-A3 are removed from the associated set a, in which case the tentative associated set a={A, A4, A5, A6}.

Then it is determined whether any two of candidate associated accounts A4-A6 in the tentative associated set a are owned by two different owners. Namely, it is determined respectively whether two accounts of each pair of A4 and A5, A4 and A6, A5 and A6 are owned by two different owners. If it is determined that the degree of association of D and the exclusion index E between the candidate associated accounts A4 and A5 meet the different-owner condition (E>=p*D, 0<p<1), and the degree of association of the candidate associated account A4 with the to-be-set account A is less than the degree of association of the candidate associated account A5 with the to-be-set account A, then the candidate associated account A4 is removed from tentative associated set a. After step S403, the associated set a of the to-be-set account A is a={A, A5, A6}, in which case the to-be-set account A is also set as an associated account in associated set a, such that the associated set a includes associated accounts A, A5 and A6.

In step S404, determination in steps S402 and S403 is also performed on any other account, and an associated set corresponding to the any other account is obtained. For example, the associated set b of account B is b={B, B1, B2}, the associated set a5 of account A5 is a5={A, A5, A6}, and the associated set A3 of account A4 is A3={A3, A6}.

In step S405, the converging module 22 performs convergence processing on the aforementioned associated sets. For example, associated accounts in associated sets of account A and account A5 are identical, so associated sets of account A and account A5 are merged as one set; associated sets of accounts A3, A5 and A share some of associated accounts, then the three associated sets are divided into {A3}, {A, A5}, and {A6}, to ensure that after the convergence processing, no associated account in any one associated set appears in another associated set; meanwhile, no two associated accounts in each associated set meet the aforementioned different-owner condition.

In step S406, the setting module 23 sets identical natural person information for the to-be-set account A (also an associated account) and associated account A5 in the associated set containing the to-be-set account A, such that the natural person information of account A and account A5 is obtained, in which case the same natural person may be set for account A and account A5 according to the natural person information of account A and account A5 to eliminate negative impact of a natural person having multiple accounts on some account applications, such that system resources may be utilized more effectively.

Figure 7:
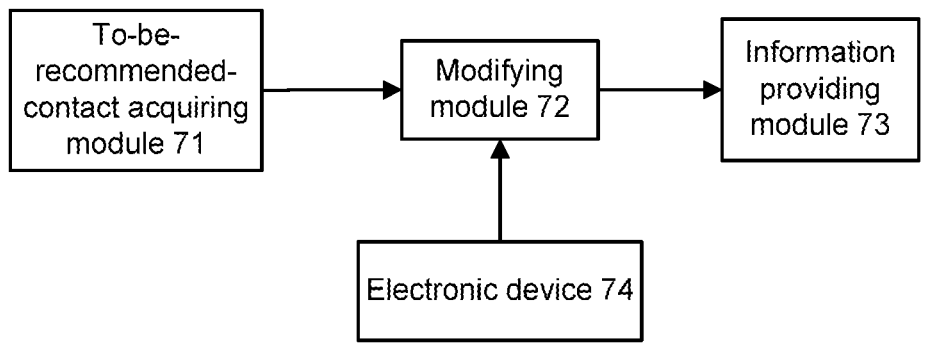
FIG. 7 is a schematic diagram of a structure of an electronic device according to a preferred embodiment of the disclosure.

The disclosure further relates to an electronic device, referring to FIG. 7, which is a schematic diagram of a structure of an electronic device according to a preferred embodiment of the disclosure. The electronic device includes a to-be-recommended-contact acquiring module 71, a modifying module 72, and an information providing module 73. The to-be-recommended-contact acquiring module 71 may be configured for determining, according to a number of contact accounts shared by a first account and a second account, the second account as a contact account to be recommended to the first account, where the second account is not a contact account of the first account. The modifying module 72 may be configured for modifying, according to natural person information of a contact account shared by the first account and the contact account to be recommended to the first account, the number of the contact accounts shared by the first account and the contact account to be recommended to the first account to obtain the modified number of the contact accounts shared by the first account and the contact account to be recommended to the first account. The information providing module 73 may be configured for providing, according to the modified number of the contact accounts shared by an account and the contact account to be recommended to the account, the account with account information of the contact account to be recommended to the account. The natural person information of the contact account shared by an account and the contact account to be recommended to the account may be set using the aforementioned electronic device 74.

The to-be-recommended-contact acquiring module 71 of an electronic device according to the disclosure determines whether to set a second account as a contact account to be recommended to a first account according to a number of contact accounts (such as friend accounts) shared by the first account and the second account. If the to-be-recommended-contact acquiring module 71 determines to set the second account as a contact account to be recommended to the first account, the modifying module 72 then modifies a number of contact accounts shared by an account and the contact account to be recommended to the account according to natural person information of a contact account shared by the account and the contact account to be recommended to the account to obtain the modified number of the contact accounts shared by the account and the contact account to be recommended to the account, where the natural person information of the contact account shared by the first account and the contact account to be recommended to the first account is set using the electronic device 74. Finally, the information providing module 73 determines whether to provide an account with account information of the contact account to be recommended to the account according to the modified number of the contact accounts shared by the account and the contact account to be recommended to the account.

A specific working flow of the electronic device is identical or similar to a flow of the following account information providing method and a working flow of the corresponding electronic device aforementioned (for setting natural person information) (see specific embodiments of the following account information providing method and of the corresponding electronic device aforementioned for details).

Figure 8:
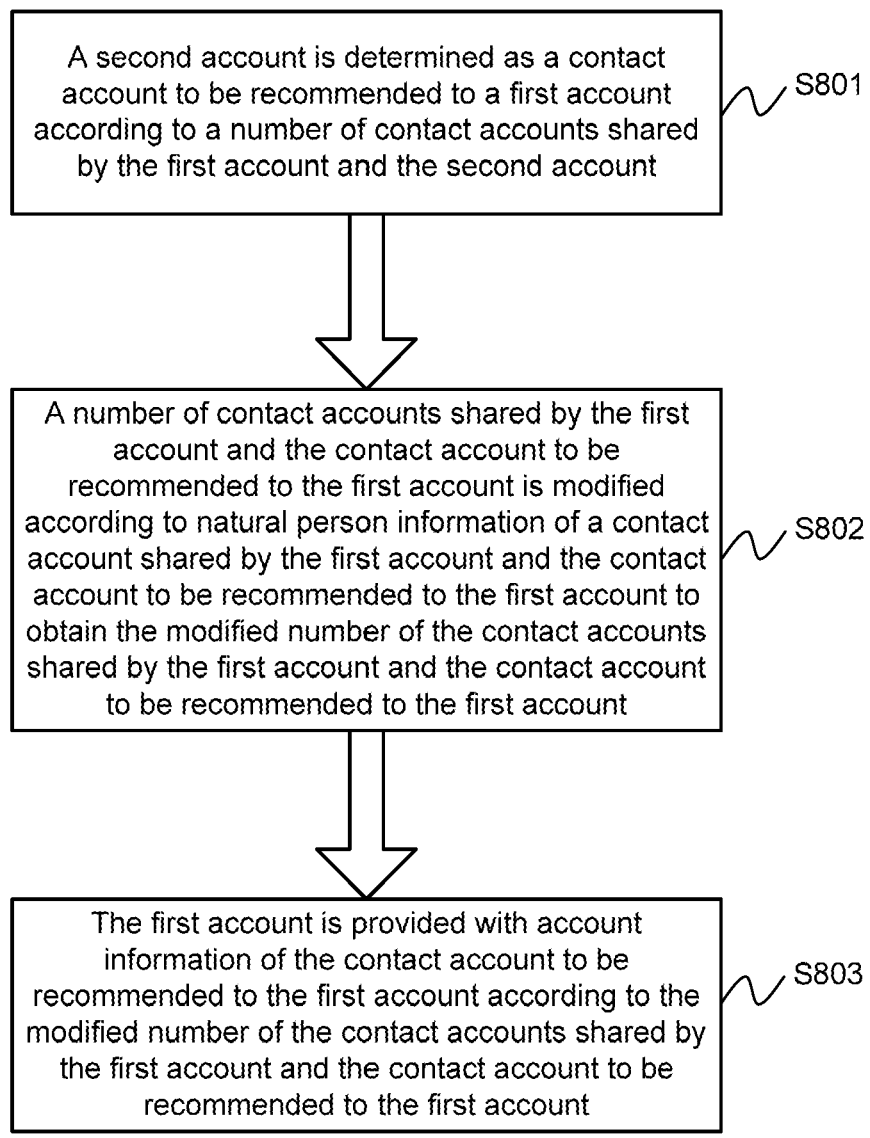
FIG. 8 is a flowchart of an account information providing method according to a preferred embodiment of the disclosure.

The disclosure further relates to an account information providing method, referring to FIG. 8, which is a flowchart of an account information providing method according to a preferred embodiment of the disclosure. The account information providing method includes steps as follows.

In step S801, a second account is determined as a contact account to be recommended to a first account according to a number of contact accounts shared by the first account and the second account, and the flow goes to step S802.

In step S802, a number of contact accounts shared by the first account and the contact account to be recommended to the first account is modified according to natural person information of a contact account shared by the first account and the contact account to be recommended to the first account to obtain the modified number of the contact accounts shared by the first account and the contact account to be recommended to the first account, and the flow goes to step S803.

In step S803, the first account is provided with account information of the contact account to be recommended to the first account according to the modified number of the contact accounts shared by the first account and the contact account to be recommended to the first account.

The account information providing method ends at step S803.

A flow of the account information providing method based on natural person information according to the disclosure will be elaborated below.

In step S801, when a virtual social networking platform receives a request for friend recommendation (i.e., request for contact recommendation) from a subscriber, the virtual social networking platform analyzes existing friends of an account of the subscriber to obtain a list including a strange account (i.e., a second account) sharing a certain number of friends with the account (i.e., the first account), where the strange account is not a friend account (i.e., not a contact account) of the account and each account, and another account may or may not be a friend account (i.e., contact account) of the each account. A to-be-recommended-contact acquiring module 71 determines, according to the number of friend accounts shared by the account and the strange account, whether to set the strange account as a friend account to be recommended (i.e., contact account to be recommended). A number of friend accounts shared by the account and the strange account meeting a standard for recommendation may be set as needed, and in general will be greater than 2, to avoid a case where the account and the strange account only share a few friend accounts, while having distant real-life social circles, in which case friend account recommendation failing to truthfully reflect a real-life relationship may be performed on the account.

In step S802, a virtual social networking platform determines natural person information of each friend account shared by the account and the friend account to be recommended. The natural person information of the shared friend account is used for determining the number of actual natural persons in friend accounts shared by the account and the friend account to be recommended, so as to avoid a case where account information of a friend is provided to the account according to the number of friend accounts shared by the account and the friend account to be recommended within the virtual social networking platform. The natural person information of all accounts used by the same natural person on the virtual social networking platform are identical, which, for example, is a fixed ID number. See a specific embodiment of the natural person information setting method for setting the natural person information.

Then, a modifying module 72 modifies, according to natural person information of each friend account shared by the account and the friend account to be recommended, the number of friend accounts shared by the account and the friend account to be recommended. Namely, two shared friend accounts with identical natural person information are merged as one shared friend account. Finally, the modified number of friend accounts shared by the account and the friend account to be recommended is obtained.

In step S803, an information providing module 73 determines, according to the modified number of friend accounts shared by the account and the friend account to be recommended, whether to provide the account with the account information of the friend account to be recommended, where the modified number of friend accounts shared by the account and the friend account to be recommended meeting the standard for recommendation may be set as needed, the number may be equal to the number of friend accounts shared by the account and the strange account meeting the standard for recommendation in step S801. If the modified number of friend accounts shared by the account and the friend account to be recommended does not meet the aforementioned standard for recommendation, then the account is not provided with the account information of the friend account to be recommended.

Further, in using the account information providing method according to the disclosure, if a virtual social networking platform finds that the natural person information of the friend account to be recommended is identical to the natural person information of a certain friend account of the account requesting friend recommendation, then the virtual social networking platform will delete the friend account to be recommended from a list of recommended friend accounts, such that friend recommendation is closer to a real-life relationship while reducing the risk of exposure of privacy.

Figure 1:
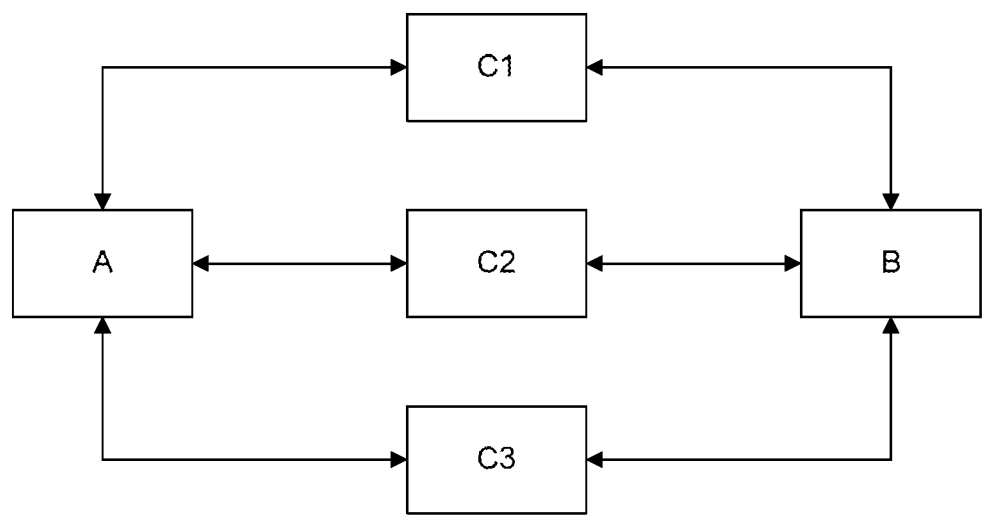
FIG. 1 is a schematic diagram of a relationship between multiple circles on a virtual social networking platform.
Figure 9:
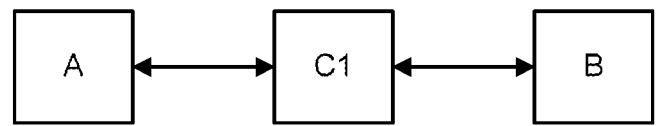
FIG. 9 is a schematic diagram of the relationship between the multiple circles shown in FIG. 1 after the relationship between the multiple circles is processed using an account information providing method according to the disclosure.

FIG. 9 is a schematic diagram of the relationship between the multiple circles shown in FIG. 1 after the relationship between the multiple circles is processed using an account information providing method according to the disclosure. With the account information providing method based on natural person information according to the disclosure, a virtual social networking platform will read the natural person information of the three friends C1, C2, and C3 shared by the account of the circle host A and the account of the circle host B in FIG. 1, and will modify, after determining that natural person information of C1, C2, and C3 are identical, the number of friend accounts shared by the account of the circle host A and the account of the circle host B to be one, thereby eliminating negative impact of a natural person having multiple accounts on friend recommendation.

Those skilled in the art may understand that all or part of the flow of the embodiments of the methods may be implemented by instructing a related hardware by a computer program which may be stored in a computer-readable storage medium. When executed, the program may include a flow of an embodiment of an aforementioned method. The storage medium may be a magnetic disk, a CD, a Read-Only Memory (ROM) or a Random Access Memory (RAM), and the like.

With the natural person information setting method, the account information providing method, the electronic devices and the storage medium according to the disclosure, it is possible to eliminate negative impact of a natural person having multiple accounts on friend recommendation, such that system resources may be utilized more effectively in performing friend recommendation. Negative impact a natural person having multiple accounts may produce on friend recommendation is eliminated while avoiding waste of system resources for performing friend recommendation. Meanwhile, natural person information set according to the disclosure may be applied not only in friend recommendation, but also in other fields of online social application, to eliminate negative impact produced by a natural person having multiple accounts on the application.

Terms used in the disclosure, such as "component", "module", "system" and "interface", in general are intended to refer to computer-relevant entities, such as hardware, a combination of hardware and software, a software or software in execution. For example, a component may be but is not limited to a process running in a processor, a processor, an object, an executable application, an executed thread, a program and/or a computer. By illustration, both an application running in a controller and the controller may be components. One or more components may exist in an executed process and/or thread, and a component may be located on a computer and/or distributed among two or more computers.

Moreover, a claimed subject matter may be implemented as a method, apparatus or manufacture controlling a computer to implement the disclosed subject matter using a standard programming and/or engineering technology produce software, firmware, hardware or any combination thereof. The term "manufacture" used herein is intended to include a computer program that may be accessed from any computer-readable device, carrier or medium. Of course, those skilled in the art should understand that it is possible to perform a lot of modifications on the configuration without departing from the scope of the claimed subject matter.

Figure 10:
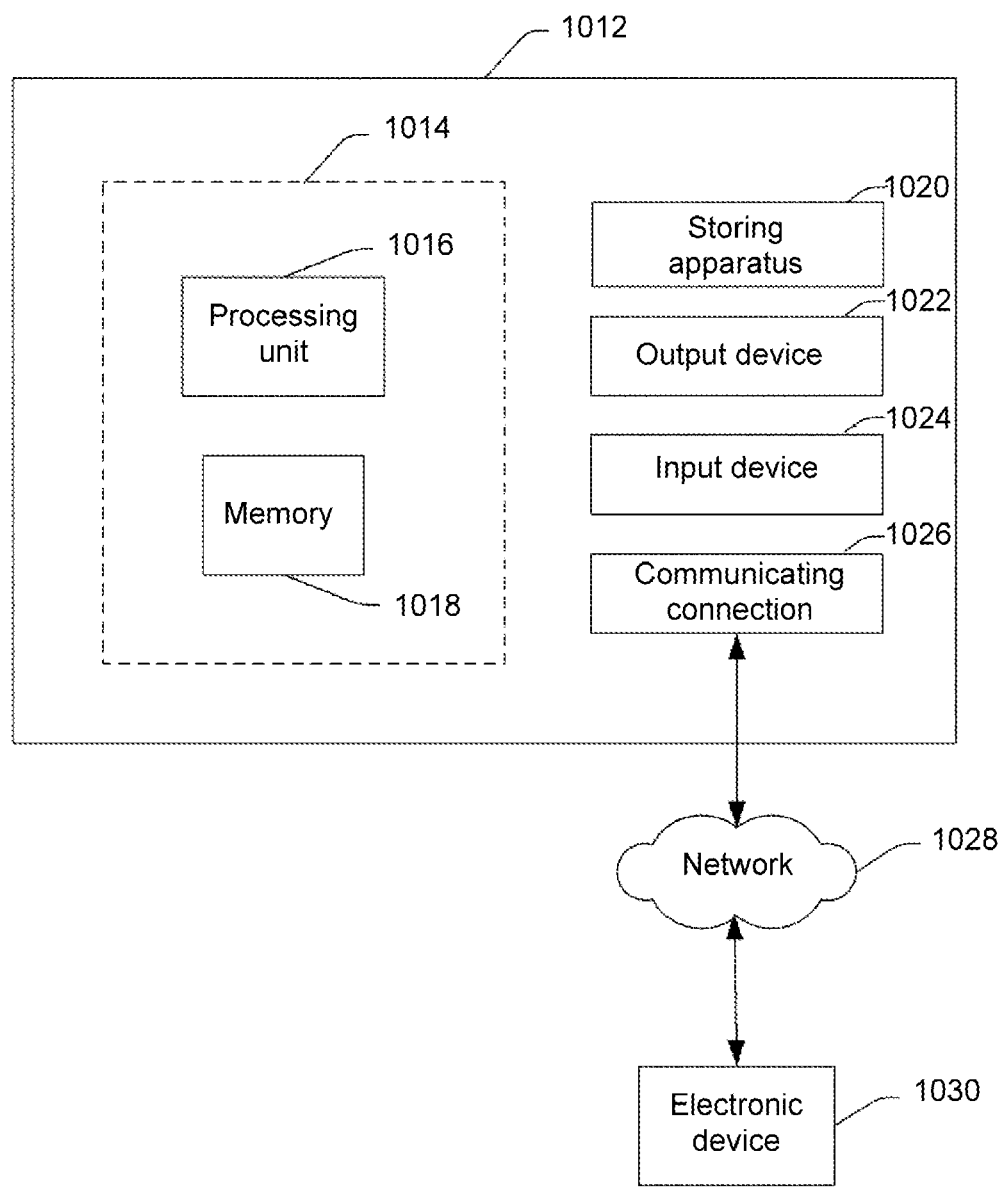
FIG. 10 is a schematic diagram of a structure of a working environment of an electronic device according to the disclosure.

FIG. 10 and the following discussion provide brief, general description of a working environment for implementing the one or more electronic devices according to the disclosure. The working environment in FIG. 10 is merely an example of the proper working environment and is not intended to propose any limit on the scope of the use or function of the working environment. An example of an electronic device 1012 may include but is not limited to a personal computer, a server computer, a handheld or laptop device, a mobile device (such as a mobile phone, a Personal Digital Assistant (PDA), a media player), a multi-processor system, a consumer electronic device, a minicomputer, a large computer, a distributed computing environment including any aforementioned system or device, and the like.

Although not required, an embodiment is described under a universal background where "computer-readable instructions" are executed by one or more electronic devices. The computer-readable instructions may be distributed via a computer-readable medium (discussed next). The computer-readable instructions may be implemented as a program module, such as a function, object, Application Programming Interface (API), and data structure that execute a specific task or implement a specific abstract data type. Typically, functions of the computer-readable instructions may be combined or distributed freely in various environments.

FIG. 10 illustrates an example of an electronic device 1012 according to one or more embodiments including the natural person information setting method and the account information providing method according to the disclosure. In a configuration, the electronic device 1012 includes at least one processing unit 1016 and a memory 1018. According to an exact configuration and type of the electronic device, the memory 1018 may be volatile (such as RAM), non-volatile (such as ROM, flash memory, and the like) or a combination of the two. The configuration is illustrated by dashed lines 1014 in FIG. 10.

In another embodiment, the electronic device 1012 may include additional characteristics and/or functions. For example, device 1012 may further include an additional (removable and/or non-removable, for example) storing apparatus, including but not limited to a magnetic storing apparatus, optical storing apparatus, and the like. Such an additional storing apparatus is illustrated as the storing apparatus 1020 in FIG. 10. In an embodiment, the computer-readable instructions for implementing one or more embodiments provided herein may be stored in the storing apparatus 1020. The storing apparatus 1020 may further store other computer-readable instructions for implementing an operation system, application program, and the like. The computer-readable instructions may be loaded into the memory 1018 and executed by the processing unit 1016, for example.

The term "computer-readable medium" used herein includes a computer storage medium, which includes a volatile or non-volatile, removable or non-removable medium implemented by any method or technology for storing information such as computer-readable instructions or other data. The memory 1018 and the storing apparatus 1020 are examples of the computer storage medium. The computer storage medium includes but is not limited to RAM, ROM, EEPROM, flash memory or other memory technology, CD-ROM, Digital Versatile Disc (DVD) or other optical storing apparatus, cassette tape, magnetic tape, magnetic disk storing apparatus or other magnetic storing devices, or any other medium that can be used for storing desired information and can be accessed by the electronic device 1012. Any such computer storage medium may be part of the electronic device 1012.

The electronic device 1012 may further include a communicating connection 1026 allowing the electronic device 1012 to communicate with another device. The communicating connection 1026 may include but is not limited to a modem, Network Interface Card (NIC), integrated network interface, radio-frequency transmitter/receiver, infrared port, USB connection or other interfaces for connecting the electronic device 1012 to other electronic devices. The communicating connection 1026 may be a cable connection or a wireless connection. The communicating connection 1026 may transmit and/or receive communicating media.

The term "computer-readable medium" may include a communicating medium. The communicating medium typically includes computer-readable instructions or other data in "modulated data signal" such as a carrier or another transferring mechanism, and includes any information delivering medium. The term "modulated data signal" may include such a signal in which one or more features are set or changed so as to encode information into the signal.

The electronic device 1012 may include an input device 1024, such as a keyboard, a mouse, a pen, a voice input device, an input-by-touch device, an infrared camera, a video input device, and/or any other input device. The device 1012 may further include an output device 1022, such as one or more displays, speakers, printers, and/or any other output device. The input device 1024 and the output device 1022 may be connected to the electronic device 1012 via a cable connection, a wireless connection or any combination thereof. In an embodiment, an input device or output device from another electronic device may be used as the input device 1024 or the output device 1022 of the electronic device 1012.

Components of the electronic device 1012 may be connected via various interconnects (such as a bus). Such interconnects may include a Peripheral Component Interconnect (PCI) (such as PCI Express), a Universal Serial Bus (USB), a Firewire IEEE 1394, an optical bus structure, and the like. In another embodiment, components of the electronic device 1012 may interconnect via a network. For example, the memory 1018 may be formed by multiple physical memory units located at different physical locations and interconnected via a network.

Those skilled in the art should understand that a storing device for storing the computer-readable instructions may distributed across a network. For example, an electronic device 1030 that may be accessed via a network 1028 may store the computer-readable instructions for implementing one or more embodiments provided by the disclosure. The electronic device 1012 may access the electronic device 1030 and download part or all of the computer-readable instructions for execution. Alternatively, the electronic device 1012 may download multiple computer-readable instructions as needed, or some instructions may be executed at the electronic device 1012 and some instructions may be executed at the electronic device 1030.

Provided herein are various operations of embodiments. In an embodiment, one or more of the operations may form computer-readable instructions stored on one or more computer-readable media, which when executed at an electronic device, will make a computing device execute said operations. A described order of some or all of the operations should not be construed as implying that such operations must be order-related. Those skilled in the art should understand an alternative sequence having benefits of the present specification. Moreover, it should be understood that, not all of the operations necessarily exist in each embodiment provided herein.

In addition, the word "preferred" used herein means for example or as an illustration. Any aspect or design described herein as "preferred" shall not necessarily be construed as being more advantageous than another aspect or design. To the contrary, use of the word "preferred" is intended to propose a concept specifically. The term "or" as used herein means an inclusive "or" instead of an exclusive "or". Namely, unless specified otherwise or evident from context, "X uses A or B" naturally means to include any combination of A and/or B. Namely, "X uses A or B" is met in any case where X uses A, X uses B, or X uses both A and B.

In addition, although the disclosure has been illustrated and described in one or more implementations, after reading and understanding the specification and drawings, those skilled in the art will think of equivalent variations and modifications. The disclosure includes all such modifications and variations, and is limited only by the scope of the claims. In particular, as to a function executed by said component (such as an element, a resource, and the like), terms for describing said component refer to an arbitrary component (unless indicated otherwise) executing a specified function of said component (for example both components are equivalent in terms of functioning), even if the arbitrary component is not identical in structure with a structure disclosed herein executing a function in an exemplary implementation of the disclosure. In addition, although specific characteristics of the disclosure have been disclosed with respect to just one of a number of implementations, such characteristics may be combined with one or more other characteristics of another implementation which for example are possibly beneficial or desirable to a given or specific application. Moreover, terms such as "include", "have", "contain" or a variant thereof used in a specific implementation or claim are intended to include in a way similar to the term "comprise".

To sum up, although the disclosure has disclosed preferred embodiments as aforementioned, the embodiments are not intended to limit the disclosure, those with ordinary skills in the art may make various modification and variations without departing the spirit and scope of the disclosure, and the protection scope of the disclosure is defined by the scope of the claims.

The invention claimed is:

1. A friend recommendation method, comprising:
  receiving, by a sever, a request for friend recommendation from a terminal, and obtaining a list of strange accounts sharing common friends with an account of the terminal;
  determining, by the server, friend accounts to be recommended for the terminal from the list of strange accounts according to the number of friend accounts shared by the account of the terminal and the strange accounts;
  setting, by the server, natural person information of each friend account shared by the account of the terminal and the friend accounts to be recommended;
  modifying, by the server, according to the natural person information, the number of friend accounts shared by the account of the terminal and the friend accounts to be recommended; and
  providing, by the server, according to the modified number of friend accounts, the terminal with account information of the friend accounts to be recommended;
  wherein the setting, by the server, natural person information of each friend account shared by the account of the terminal and the friend accounts to be recommended comprises:
  for each friend account, determining an associated set of each account according to a degree of association and an exclusion index of another account with the each account;
  performing convergence processing on all associated sets, such that after the convergence processing, no associated account in any one associated set appears in another associated set; and
  setting identical natural person information for any associated account in a same associated set having gone through the convergence processing and setting a same natural person for any associated account in the same associated set according to the identical natural person information,
  wherein the determining an associated set of each account according to a degree of association and an exclusion index of another account with the each account comprises:
  filtering, according to a degree of association and an exclusion index of another account in a tentative associated set of an account for which natural person information is to be set with an account in the tentative associated set, a candidate associated account comprised in the tentative associated set to obtain an associated set of the account for which the natural person information is to be set, wherein the associated set of the account for which the natural person information is to be set comprises an associated account; and
  successively taking the each account as the account for which the natural person information is to be set, and acquiring the associated set of the each account.

2. The method according to claim 1, further comprising: determining, by the server, according to information on static association and information on dynamic association of the another account with the each account, the degree of association of the another account with the each account, wherein the information on static association of the another account with the each account comprises at least one of: a similarity between personal data of the each account and personal data of the another account, a similarity between contact information of the each account and contact information of the another account, or a similarity between interest information of the each account and interest information of the another account; and the information on dynamic association of the another account with the each account comprises at least one of: a similarity between login behavior information of the each account and login behavior information of the another account, or a similarity between online behavior information of the each account and online behavior information of the another account.

3. The method according to claim 1, further comprising: determining, by the server, according to information on static exclusion and information on dynamic exclusion of the another account with the each account, the exclusion index of the another account with the each account, wherein the information on static exclusion comprises a similarity between physical location information of the each account and physical location information of the another account; and the information on dynamic exclusion comprises at least one of: a similarity between login behavior information of the each account and login behavior information of the another account, a similarity between online behavior information of the each account and online behavior information of the another account, or information on an interaction of the another account with the each account.

4. The method according to claim 1, wherein the tentative associated set is determined according to the degree of association of the another account with the each account.

5. The method according to claim 4, wherein the determining a tentative associated set of an account for which natural person information is to be set according to the degree of association of the another account with the each account comprises:

putting the account for which the natural person information is to be set into the tentative associated set;

determining a degree of association of another account with the account for which the natural person information is to be set, and, when it is determined that the degree of association of the another account with the account for which the natural person information is to be set is greater than a first set value, putting the another account into the tentative associated set; and determining a degree of association of another account with an account put in the tentative associated set, when it is determined that the degree of association of the another account with the account put in the tentative associated set is greater than a first set value and that the another account has not been put in the tentative associated set, putting the another account into the tentative associated set, and repeating the determining and putting step until no more account is put in the tentative associated set, wherein the tentative associated set comprises the candidate associated account.

6. The method according to claim 4, wherein the filtering, according to a degree of association and an exclusion index of another account in the tentative associated set with an account in the tentative associated set, the candidate associated account in the tentative associated set to obtain an associated set of the account for which the natural person information is to be set comprises:

determining whether the account for which the natural person information is to be set and the candidate associated account in the tentative associated set are owned by different owners according to a different-owner condition of $E>=p*D,$ where D is the degree of association of the candidate associated account with the account for which the natural person information is to be set in the tentative associated set, E is the exclusion index of the candidate associated account with the account for which the natural person information is to be set in the tentative associated set, and p is a constant, with $0<p<1$;

removing a candidate associated account meeting the different-owner condition from the tentative associated set; and determining whether any two candidate associated accounts in the tentative associated set that have gone through the last determining and removing step are owned by different owners according to the different-owner condition of $E>=p*D,$ where D is a degree of association between the two candidate associated accounts in the tentative associated set that are undergoing the current determining step, E is an exclusion index between the two candidate associated accounts in the tentative associated set that are undergoing the current determining step, and p is a constant, with $0<p<1$; and removing, from the tentative associated set, a candidate associated account of the two candidate associated accounts meeting the different-owner condition that has a smaller degree of association with the account for which the natural person information is to be set, to obtain the associated set of the account for which the natural person information is to be set, wherein the associated set of the account for which the natural person information is to be set comprises an associated account.

7. The method according to claim 1, wherein the performing convergence processing on all associated sets, such that after the convergence processing, no associated account in any one associated set appears in another associated set comprises:

merging two associated sets with identical associated accounts, and dividing associated sets sharing some of associated accounts into multiple associated sets, such that after the convergence processing, no associated account in any one associated set appears in another associated set.

8. The method according to claim 1, wherein the modifying, by the server, according to the natural person information, the number of friend accounts shared by the account of the terminal and the friend accounts to be recommended comprises:

merging the friend accounts shared by the account of the terminal and the friend accounts to be recommended with identical natural person information as one shared friend account; and acquiring a modified number of the friend accounts shared by the account of the terminal and the friend accounts to be recommended.

9. The method according to claim 1, further comprising:
generating a list of recommended friend accounts according to the account information of the friend accounts to be recommended;
wherein the method further comprises:
determining whether a friend account to be recommended in the list of recommended friend accounts has identical natural person information to a contact account of the terminal;
when it is determined that the friend account to be recommended has identical natural person information to the contact account of the terminal, deleting the friend account to be recommended from the list of recommended friend accounts.

10. The method according to claim 1, wherein the natural person information comprises an ID of an account.

11. An electronic device, comprising:
one or more processors;
memory; and
one or more programs stored in the memory and configured to be executed by the one or more processors to provide a friend recommendation method, wherein the one or more programs comprises, according to functions:
a to-be-recommended-contact acquiring module configured for obtaining a list of strange accounts sharing common friends with an account of the terminal after receiving a request for friend recommendation from a terminal, and determining friend accounts to be recommended for the terminal from the list of strange accounts according to the number of friend accounts shared by the account of the terminal and the strange accounts;
a modifying module configured for modifying, according to natural person information of each friend account shared by the account of the terminal and the friend accounts to be recommended, the number of friend accounts shared by the account of the terminal and the friend accounts to be recommended; and
an information providing module configured for providing, according to the modified number of friend accounts, the terminal with account information of the friend accounts to be recommended;
wherein the natural person information of each friend account shared by the account of the terminal and the friend accounts to be recommended is set according to functions:
an associated-set determining module configured for determining an associated set of each account according to a degree of association and an exclusion index of another account with the each account;
a converging module configured for performing convergence processing on all associated sets, such that after the convergence processing, no associated account in any one associated set appears in another associated set; and
a setting module configured for setting identical natural person information for any associated account in a same associated set having gone through the convergence processing, and setting a same natural person for any associated account in the same associated set according to the identical natural person information;
wherein the associated-set determining module is further configured to:
determine a tentative associated set of an account for which natural person information is to be set;
filter, according to a degree of association and an exclusion index of another account in the tentative associated set with an account in the tentative associated set, the candidate associated account in the tentative associated set to obtain an associated set of the account for which the natural person information is to be set, wherein the associated set of the account for which the natural person information is to be set comprises an associated account; and
successively take the each account as the account for which the natural person information is to be set, and acquire the associated set of the each account.

12. The electronic device according to claim 11, comprising:
a degree-of-association determining module configured for determining, according to information on static association and information on dynamic association of the another account with the each account, the degree of association of the another account with the each account, wherein
the information on static association of the another account with the each account comprises at least one of: a similarity between personal data of the each account and personal data of the another account, a similarity between contact information of the each account and contact information of the another account, or a similarity between interest information of the each account and interest information of the another account; and
the information on dynamic association of the another account with the each account comprises at least one of: a similarity between login behavior information of the each account and login behavior information of the another account, or a similarity between online behavior information of the each account and online behavior information of the another account.

13. The electronic device according to claim 11, comprising:
an exclusion-index determining module configured for determining, according to information on static exclusion and information on dynamic exclusion of the another account with the each account, the exclusion index of the another account with the each account, wherein
the information on static exclusion comprises a similarity between physical location information of the each account and physical location information of the another account; and
the information on dynamic exclusion comprises at least one of: a similarity between login behavior information of the each account and login behavior information of the another account, a similarity between online behavior information of the each account and online behavior information of the another account, or information on an interaction of the another account with the each account.

14. The electronic device according to claim 11, wherein the tentative associated set of the account for which natural person information is to be set is determined with a tentative-associated-set-determining unit according to the degree of association of the another account with the each account, wherein the tentative associated set comprises a candidate associated account.

15. The electronic device according to claim 14, wherein the tentative-associated-set determining unit comprises:

a first determining sub-unit configured for putting the account for which the natural person information is to be set into the tentative associated set; and a second determining sub-unit configured for: determining a degree of association of another account with an account put in the tentative associated set; and when it is determined that the degree of association of the another account with the account put in the tentative associated set is greater than a first set value and that the another account has not been put in the tentative associated set, putting the another account into the tentative associated set.

16. The electronic device according to claim 14, wherein the filtering is performed with a filtering unit comprising:

a first filtering sub-unit configured for: determining whether the account for which the natural person information is to be set and the candidate associated account in the tentative associated set are owned by different owners according to a different-owner condition of $$E >= p*D,$$

where D is the degree of association of the candidate associated account with the account for which the natural person information is to be set in the tentative associated set, E is the exclusion index of the candidate associated account with the account for which the natural person information is to be set in the tentative associated set, and p is a constant, with 0<p<1, and removing a candidate associated account meeting the different-owner condition from the tentative associated set; and a second filtering sub-unit configured for: determining whether any two candidate associated accounts in the tentative associated set that have been processed by the first filtering sub-unit are owned by different owners according to the different-owner condition of $$E >= p*D,$$

where D is a degree of association between the two candidate associated accounts in the tentative associated set that are undergoing the current determining step, E is an exclusion index between the two candidate associated accounts in the tentative associated set that are undergoing the current determining step, and p is a constant, with 0<p<1; and removing, from the tentative associated set, a candidate associated account of the two candidate associated accounts meeting the different-owner condition that has a smaller degree of association with the account for which the natural person information is to be set, to obtain the associated set of the account for which the natural person information is to be set, wherein the associated set of the account for which the natural person information is to be set comprises an associated account.

17. The electronic device according to claim 11, wherein the converging module is configured for merging two associated sets with identical associated accounts, and dividing associated sets sharing some of associated accounts into multiple associated sets, such that after the convergence processing, no associated account in any one associated set appears in another associated set.

18. The electronic device according to claim 11, wherein the modifying module is further configured for: merging the friend accounts shared by the account of the terminal and the friend accounts to be recommended with identical natural person information as one shared friend account, and acquiring a modified number of the friend accounts shared by the account of the terminal and the friend accounts to be recommended.

19. The electronic device according to claim 11, wherein the information providing module is further configured for: generating a list of recommended friend accounts according to the account information of the friend accounts to be recommended; determining whether a friend account to be recommended in the list of recommended friend accounts has identical natural person information to a contact account of the terminal; and when it is determined that the friend account to be recommended has identical natural person information to the contact account of the terminal, deleting the friend account to be recommended from the list of recommended friend accounts.

20. A non-transitory computer readable storage medium having stored therein instructions that, when executed by a processor, causes the processor to perform a friend recommendation method, the method comprising:

receiving, by a sever, a request for friend recommendation from a terminal, and obtaining a list of strange accounts sharing common friends with an account of the terminal;

determining, by the server, friend accounts to be recommended for the terminal from the list of strange accounts according to the number of friend accounts shared by the account of the terminal and the strange accounts;

setting, by the server, natural person information of each friend account shared by the account of the terminal and the friend accounts to be recommended;

modifying, by the server, according to the natural person information, the number of friend accounts shared by the account of the terminal and the friend accounts to be recommended; and providing, by the server, according to the modified number of friend accounts, the terminal with account information of the friend accounts to be recommended;

wherein the setting, by the server, natural person information of each friend account shared by the account of the terminal and the friend accounts to be recommended comprises:

for each friend account, determining an associated set of each account according to a degree of association and an exclusion index of another account with the each account;

performing convergence processing on all associated sets, such that after the convergence processing, no associated account in any one associated set appears in another associated set; and setting identical natural person information for any associated account in a same associated set having gone through the convergence processing, and setting a same natural person for any associated account in the same associated set according to the identical natural person information;

wherein the determining an associated set of each account according to a degree of association and an exclusion index of another account with the each account comprises:

filtering, according to a degree of association and an exclusion index of another account in a tentative associated set of an account for which natural person information is to be set with an account in the tentative associated set, a candidate associated account comprised in the tentative associated set to obtain an associated set of the account for which the natural person information is to be set, wherein the associated set of the account for which the natural person information is to be set comprises an associated account; and successively taking the each account as the account for which the natural person information is to be set, and acquiring the associated set of the each account.

\* \* \* \* \*